Patented Mar. 3, 1931

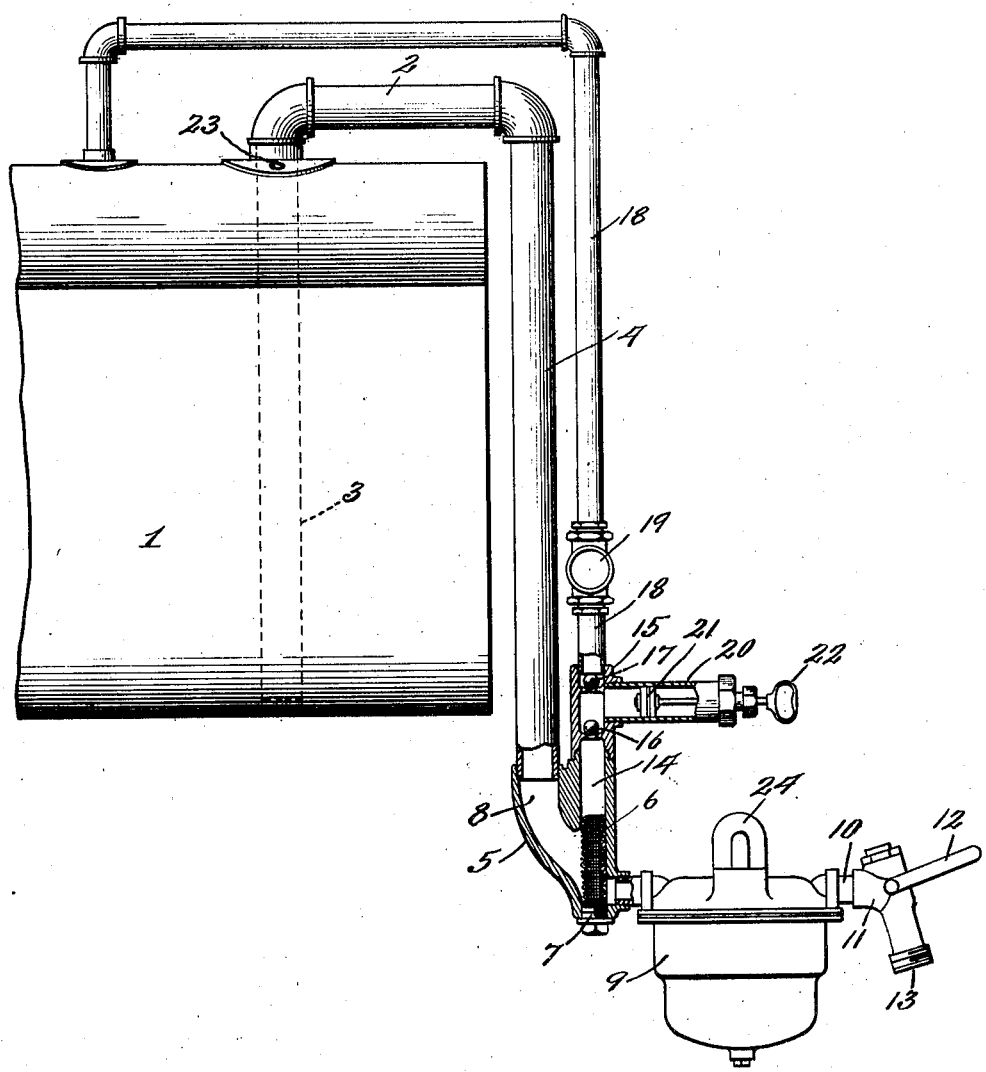

1,794,437

UNITED STATES PATENT OFFICE

HOSMER L. BLUM, OF FORT WAYNE, INDIANA, ASSIGNOR TO S. F. BOWSER & COMPANY, INC., OF FORT WAYNE, INDIANA, A CORPORATION OF INDIANA

TANK-SIPHON DISPENSING APPARATUS

Application filed July 28, 1928. Serial No. 295,909.

My invention relates to apparatus for dispensing gasoline or other liquid from tanks, and one of its objects is the provision of means for priming a siphon to which a meter is connected, in such a manner that air will be removed from both the siphon and the meter and thus cause the meter to accurately measure the flow of the liquid.

A further object of the invention is the provision of priming means for a siphon in combination with a sight device for indicating when the siphon has been primed.

Another object of the invention is the provision of a return line connected between the source and the priming means of a siphon to which a meter is connected so as to provide a circulating system ahead of the meter while the priming operation is being performed.

More particularly is the object of the present invention to provide priming means for a siphon with a return line leading back to the source of supply of the liquid so as to enable the connection of a meter to the siphon and obtain accurate metering of the flow of the liquid from the source of supply through said siphon.

Other objects of the invention will appear hereinafter, the novel features and combinations being set forth in the appended claims.

The drawing shows an elevational view, partly in section, of my invention applied to a truck tank, although it may have a general application.

In some States the handling of gasoline and other hazardous liquids must be by means other than gravity and attachments to the bottoms or ends of truck tanks is prohibited. While the provision of siphoning apparatus avoids the flow of such hazardous liquids directly from a truck tank, air becomes trapped in the siphon line when the tank is empty or when it is being filled and such entrapped air prevents the liquid from being properly metered. I have therefore provided a hand-operated reciprocating air pump for priming the siphon without the use of any by-pass immediately around the pump; I have connected a return line from the pump to the source of supply and placed a sight-glass indicator therein and with this arrangement while the siphon is being primed the entrapped air therein is removed, as well as from the meter connected to the siphon so that the gasoline or other liquid may be dispensed from the truck tank through the meter with the assurance that the meter will accurately register the amount of liquid taken from the tank.

In the accompanying drawing, 1 designates the truck tank to which the inverted U-shaped pipe 2 is connected so that one leg 3 extends from the top of the tank to a position near the bottom of the tank while the other leg 4 is outside of the tank and extends to a position below the bottom of the tank. The inverted U-shaped pipe 2 is connected rigidly to the top of the tank 1 and constitutes a siphon for emptying the tank 1.

The lower end of the leg 4 is connected to the casting 5 which may have therein a cup strainer 6 removable for cleaning purposes by removal of the screw-threaded plug 7. A passageway 8 leads from the bottom of the leg 4 of the siphon through the strainer 6 to a meter 9 which may be of the type shown in my Patent No. 1,423,597, granted July 25, 1922, for an improvement in meters. The counter or registering device of the meter is diagrammatically illustrated at 24.

Connected to the right-hand side of the meter 9 is a valve 11 which may be opened and closed by the hand lever 12 so as to permit liquid to flow through the discharge port 13, the periphery of which may be screw-threaded for the attachment of a flexible hose.

Above the strainer 6 in the casting 5 is another vertical passageway 14 and to the upper end of such passageway is connected the union 15 having therein two ball check-valves 16 and 17 both opening upwardly. To the top of the union 15 is connected a vertical pipe 18 having therein a sight-glass 19. The pipe 18 extends upwardly over the tank 1 and is connected to the top thereof, thus establishing a return line between the priming pump and the tank or source of supply of the liquid; this return line acts in the nature of a circulating system ahead of the meter 9 while the priming operation is being performed. It should also be noted that this system makes it unnecessary to provide a by-pass around the priming pump and no valve need be operated manually in connection with the priming operation.

At the right-hand side of the union 15 is connected a manually operated air pump 20. When the piston 21 of this air pump is drawn to the right by means of the handle 22 the check-valve 16 will be automatically opened and the check-valve 17 closed. When the piston 21 is pushed to the left the check-valve 16 will be closed and the check-valve 17 will be opened. Therefore when the air pump is operated while the valve 11 is closed any air entrapped in the siphon 2 will be withdrawn and forced upwardly along the pipe 18 into the tank 1. The operation of the air pump 20 effects the priming of the siphon, because after the air has been pumped from the siphon the liquid in the tank will flow until the siphon is filled with the liquid. By observing the sight-glass 19 the attendant can determine when all of the air has been pumped from the siphon and has been filled with liquid, because this condition occurs when liquid appears in the sight-glass 19. The sight-glass 19 is shown facing toward one side of the truck tank 1, but it may be arranged to face rearwardly so as to come under the direct observation of the attendant operating the pump 20; or, if desired, the pump 20 may be located so as to extend laterally so that the operator will have the sight-glass 19 directly in his view while operating the pump.

As soon as the liquid appears in the sight-glass 19 the pump 20 may be stopped and the valve 11 opened, whereupon the siphon will withdraw the gasoline or other liquid from the tank 1 and the flow of the liquid will be accurately measured by the meter 2.

When the tank 1 is empty the leg 3 of the siphon 2 is full of air and when the tank 1 is filled, air will be entrapped in the siphon above the level of the liquid in the tank and also in the leg 4, and the chambers 8 and 14. The meter itself may have air entrapped in it due to liquid being discharged out through the meter on a previous delivery. To prime the siphon the hand pump is operated with the result that the air in the siphon and in the chambers 8 and 14 will first be pumped into the pipe 18 and thence into the top of the tank 1. As soon as the gasoline flows through the siphon into the chamber 8 it continues through the strainer 6 into the meter and displaces the air in the latter which will also be passed up through the chamber 14 and into the pipe 18. As before stated, when the operator sees the liquid flowing into the sight-glass 19 he knows that the entrapped air has all been removed from the siphon and from the meter and that the valve 11 may then be opened to secure dispensing of the gasoline from the tank while being accurately measured by the meter 9.

It is desirable to connect the pipe 18 to the top of the tank 1 in order to deliver back to the tank the gasoline that flows up into the pipe 18. If a column of gasoline remains in the pipe 18 above the check-valve 17 the operator can by observation of the discontinuance of air passing through the sight-chamber determine when the entrapped air has been removed from the siphon and from the meter. The gasoline that is pumped back to the tank 1 through the pipe 18 has free flow into the latter, because truck tanks are vented to the atmosphere as indicated, for example, by the vent 23.

The meter 9 should be located sufficiently below the bottom of the tank to produce a siphon head to give an adequate flow of gasoline through the discharge port 13.

Obviously those skilled in the art may make various changes in the details and arrangement of parts without departing from the spirit and scope of the invention as defined by the claims hereto appended and I wish therefore not be restricted to the precise construction herein disclosed.

Having thus fully disclosed an embodiment of my invention, what I desire to secure by Letters Patent of the United States is:

1. In apparatus for dispensing liquids, the combination with a tank for containing the liquid to be dispensed, of a siphon comprising an inverted U-shaped pipe with one leg projecting from the top of the tank down into the same nearly to the bottom thereof and with the other leg projecting down outside of the tank below the bottom thereof, a siphon chamber connected to the bottom of the outer leg of said siphon, a meter connected to said siphon chamber, a hand-operated valve for controlling the flow from said meter to a discharge port, an air pump connected to said siphon chamber, spaced-apart check-valves one above the air pump and the other below the same, means for mounting said pump and said valves to effect pumping from said siphon chamber when said pump is operated, a sight-glass for indicating when trapped air in said siphon and said siphon chamber and said meter has been withdrawn, and a pipe leading to the top of said tank from the upper check-valve.

2. In apparatus for dispensing metered gasoline, the combination with a tank, of a siphon connected thereto, a meter connected to said siphon, a manually operated valve connected to the meter remote from its connection to said siphon, an air pump, valve mechanism associated with said pump to co-act with the latter to withdraw entrapped air from said siphon and from said meter, a pipe connecting the said pump to the top of said tank, and a sight indicator in said pipe for indicating when such air has been eliminated from said siphon and from said meter.

3. In apparatus for dispensing liquid from a tank, the combination with a siphon, of a meter connected thereto for measuring the flow of liquid through said siphon, and a pump connected to said siphon and to said meter to remove entrapped air from both when the pump is operated.

4. In apparatus for dispensing liquids from tanks, the combination with a siphon, of a meter connected to the lower end of one leg of said siphon, a valve for controlling the flow from said siphon through said meter to a discharge port, and a pump connected to said siphon in position to remove air from the meter as well as from the siphon and effect priming of the siphon.

5. In apparatus for dispensing liquids, the combination with a siphon, of a meter for measuring the flow of liquid through said siphon, and means for priming said siphon and meter while at the same time removing air from both and filling both with liquid to prevent said meter from measuring the flow of entrapped air.

6. In apparatus for dispensing metered liquid, the combination with a siphon, of a meter connected thereto, a valve for controlling the flow of liquid from said meter, and a pump having a direct communication simultaneously with the siphon and with the meter to remove air from both when the pump is operated to prime the siphon.

7. In apparatus for dispensing metered liquid, the combination with a siphon, of a meter connected thereto, a valve for controlling the flow of liquid from said meter, means for priming the siphon while at the same time removing air from both the siphon and the meter, and a pipe connecting said priming means to the source of liquid.

8. In apparatus for dispensing liquids, the combination with a siphon, of a meter, a connection between the siphon and the meter, a pump in communication through said connection with both said siphon and said meter, and means for indicating priming of said siphon while operating said pump.

9. In apparatus for dispensing metered liquid, the combination with a siphon, of a meter connected to said siphon, a valve for controlling the flow of liquid from said meter, an air pump connected to said siphon and said meter, and a sight indicator for indicating when the air has been eliminated from the siphon and from the meter and the siphon primed with liquid.

10. In apparatus for dispensing liquids, the combination with a siphon, of a meter, a connection between said siphon and said meter to afford a siphon chamber, a pump connected to said siphon chamber, a pipe for receiving air and liquid withdrawn by said pump from said siphon chamber, and a sight indicator in said pipe for indicating when air has been eliminated from both the siphon and the meter and the siphon has been primed.

In testimony whereof I have signed my name to this specification on this 24 day of July, A. D. 1928.

HOSMER L. BLUM.